(12) United States Patent
Bowater et al.

(10) Patent No.: US 11,466,803 B2
(45) Date of Patent: Oct. 11, 2022

(54) HOSE CLAMP WITH SPRING LINER AND METHOD

(71) Applicant: Ideal Clamp Products, Inc., Smyrna, TN (US)

(72) Inventors: Bruce D. Bowater, Franklin, TN (US); Edwin T. Koehler, Smyrna, TN (US)

(73) Assignee: Ideal Clamp Products, Inc., Smyrna, TN (US)

(*) Notice: Subject to any disclaimer, the term of this patent is extended or adjusted under 35 U.S.C. 154(b) by 0 days.

(21) Appl. No.: 16/764,094

(22) PCT Filed: Nov. 15, 2018

(86) PCT No.: PCT/US2018/061241
§ 371 (c)(1),
(2) Date: May 14, 2020

(87) PCT Pub. No.: WO2019/099640
PCT Pub. Date: May 23, 2019

(65) Prior Publication Data
US 2020/0278063 A1    Sep. 3, 2020

Related U.S. Application Data

(60) Provisional application No. 62/586,634, filed on Nov. 15, 2017.

(51) Int. Cl.
*F16L 33/08*    (2006.01)
*F16L 33/025*    (2006.01)
*F16L 33/02*    (2006.01)

(52) U.S. Cl.
CPC ............. *F16L 33/08* (2013.01); *F16L 33/025* (2013.01)

(58) Field of Classification Search
CPC .......... F16L 33/025; F16L 33/08; F16L 51/00
See application file for complete search history.

(56) References Cited

U.S. PATENT DOCUMENTS

| 2,089,940 | A |   | 8/1937 | Brown |
| 2,870,501 | A | * | 1/1959 | Combs .................. F16L 3/1233 24/16 PB |
| 3,142,881 | A |   | 8/1964 | Johnston |
| 3,233,922 | A |   | 2/1966 | Evans |

(Continued)

FOREIGN PATENT DOCUMENTS

| CN | 2234031 Y | 8/1996 |
| CN | 102691839 A | 9/2012 |

(Continued)

OTHER PUBLICATIONS

PCT International Search Report and Written Opinion for PCT/US2018/061241, dated Mar. 5, 2019, 14 pages.

(Continued)

*Primary Examiner* — David M Upchurch
(74) *Attorney, Agent, or Firm* — Barnes & Thornburg LLP

(57) ABSTRACT

A hose clamp includes an annular band and a spring liner. The spring liner includes an annular body having a central axis. The annular body includes a first body section, a second body section, and a central body section connecting the first body section and the second body section. Various methods include applying the hose clamp to a substrate.

21 Claims, 12 Drawing Sheets

(56) References Cited

U.S. PATENT DOCUMENTS

| | | | |
|---|---|---|---|
| 3,303,669 A * | 2/1967 | Oetiker | F16L 33/2071 |
| | | | 285/252 |
| 4,308,648 A | 1/1982 | Fay | |
| 4,310,956 A | 1/1982 | Meckstroth et al. | |
| 4,312,101 A | 1/1982 | Oetiker | |
| D285,171 S | 8/1986 | Russell | |
| 4,667,375 A | 5/1987 | Enlund | |
| 5,115,541 A | 5/1992 | Stichel | |
| 5,195,788 A * | 3/1993 | Oetiker | B23P 11/005 |
| | | | 285/252 |
| 5,220,710 A | 6/1993 | Laudan et al. | |
| 5,309,607 A | 5/1994 | Hohmann et al. | |
| 5,630,255 A | 5/1997 | Eliasson | |
| 6,000,104 A | 12/1999 | Mann | |
| 6,088,886 A | 7/2000 | Gyongyosi | |
| 7,178,204 B2 * | 2/2007 | Bowater | F16L 33/08 |
| | | | 24/20 R |
| 7,302,741 B2 * | 12/2007 | Bowater | F16L 33/08 |
| | | | 24/20 R |
| 7,389,568 B2 | 6/2008 | Crockett, IV et al. | |
| 8,650,719 B2 * | 2/2014 | Bowater | F16L 33/08 |
| | | | 24/20 R |
| 8,677,571 B2 * | 3/2014 | Bowater | F16L 33/08 |
| | | | 285/252 |
| 9,447,903 B2 | 9/2016 | Bowater | |
| 10,527,211 B2 | 1/2020 | Bowater | |
| 2005/0039306 A1 | 2/2005 | Logan et al. | |
| 2006/0162131 A1 | 7/2006 | Bowater | |
| 2007/0107168 A1 | 5/2007 | Bowater | |
| 2013/0019440 A1 | 1/2013 | Bowater | |
| 2013/0019441 A1 * | 1/2013 | Bowater | F16L 33/08 |
| | | | 24/19 |
| 2017/0167651 A1 | 6/2017 | Bowater | |

FOREIGN PATENT DOCUMENTS

| | | |
|---|---|---|
| CN | 101855487 B | 12/2012 |
| DE | 10061425 A1 | 6/2002 |
| EP | 779463 A3 | 7/1997 |
| EP | 2669562 A2 | 12/2013 |
| WO | 9731203 A1 | 8/1997 |

OTHER PUBLICATIONS

Extended European Search Report for European Application No. 18879943.1, dated Jul. 6, 2021, (8 pages).

* cited by examiner

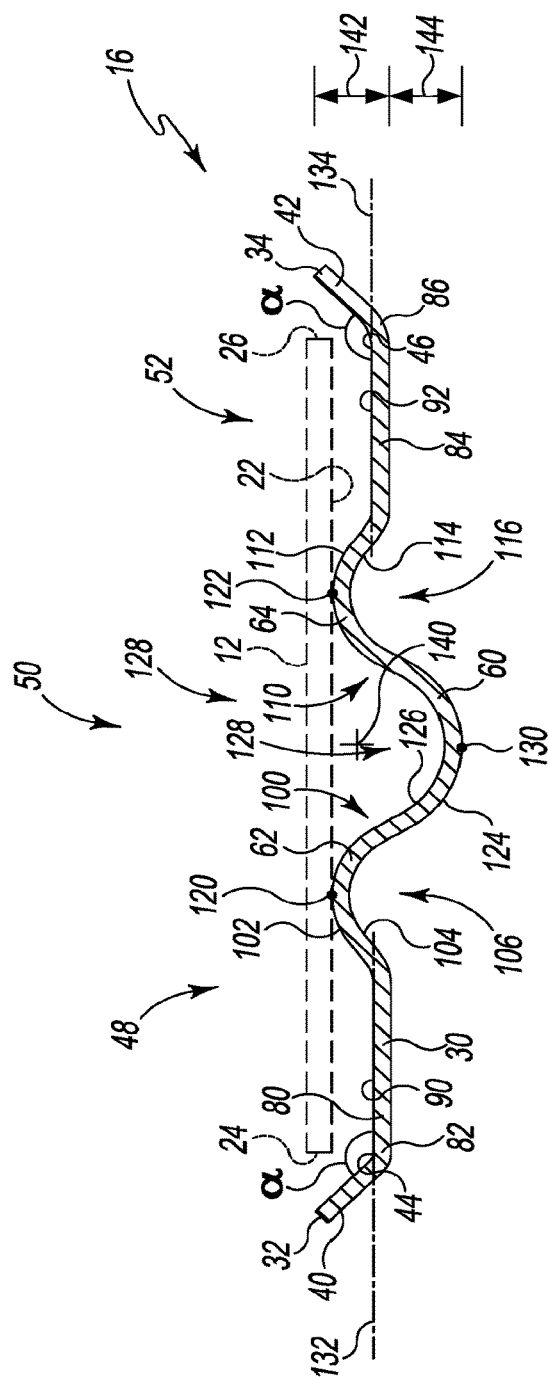
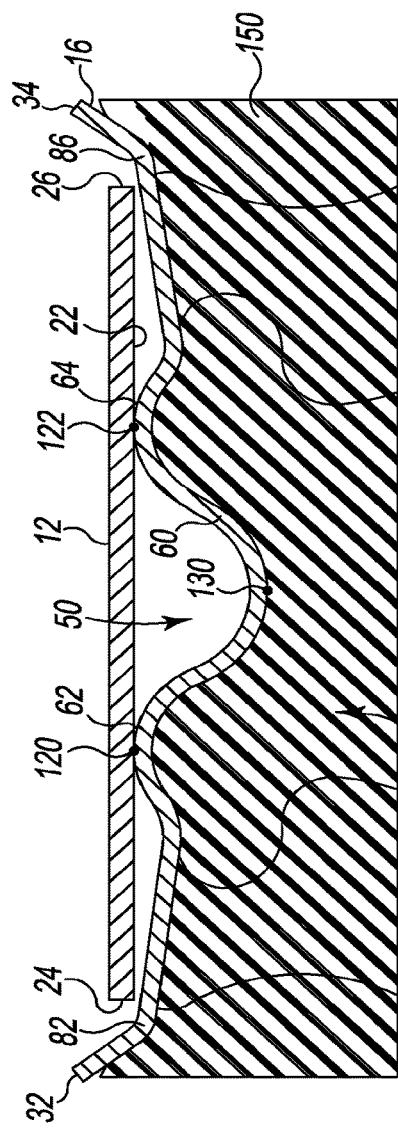
Fig. 3
Fig. 4

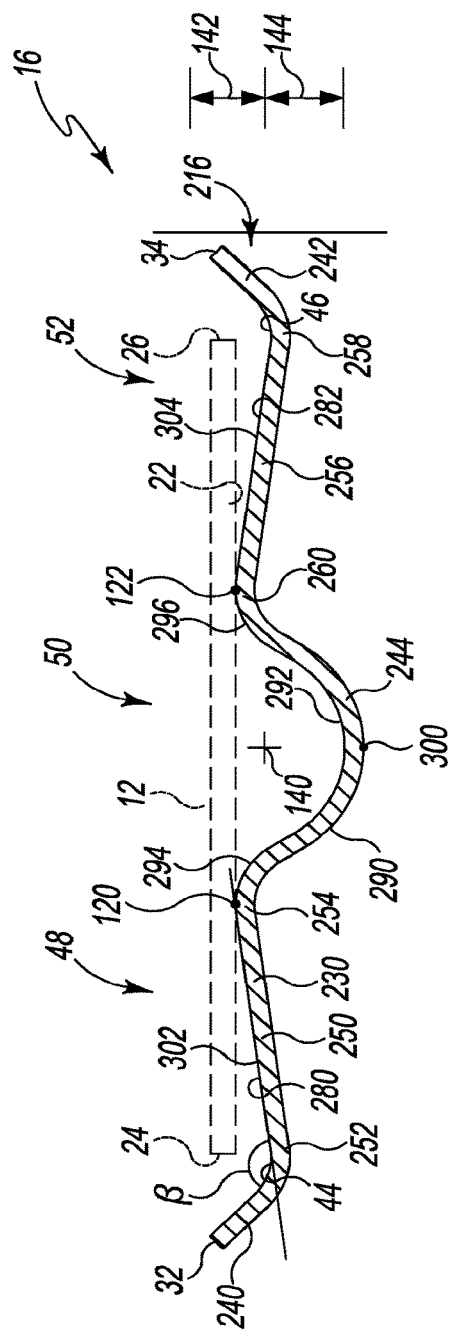
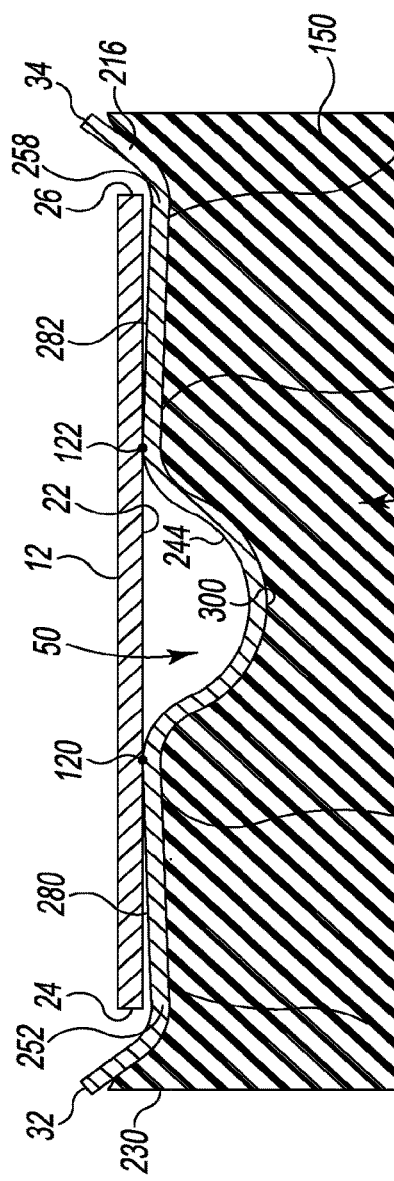

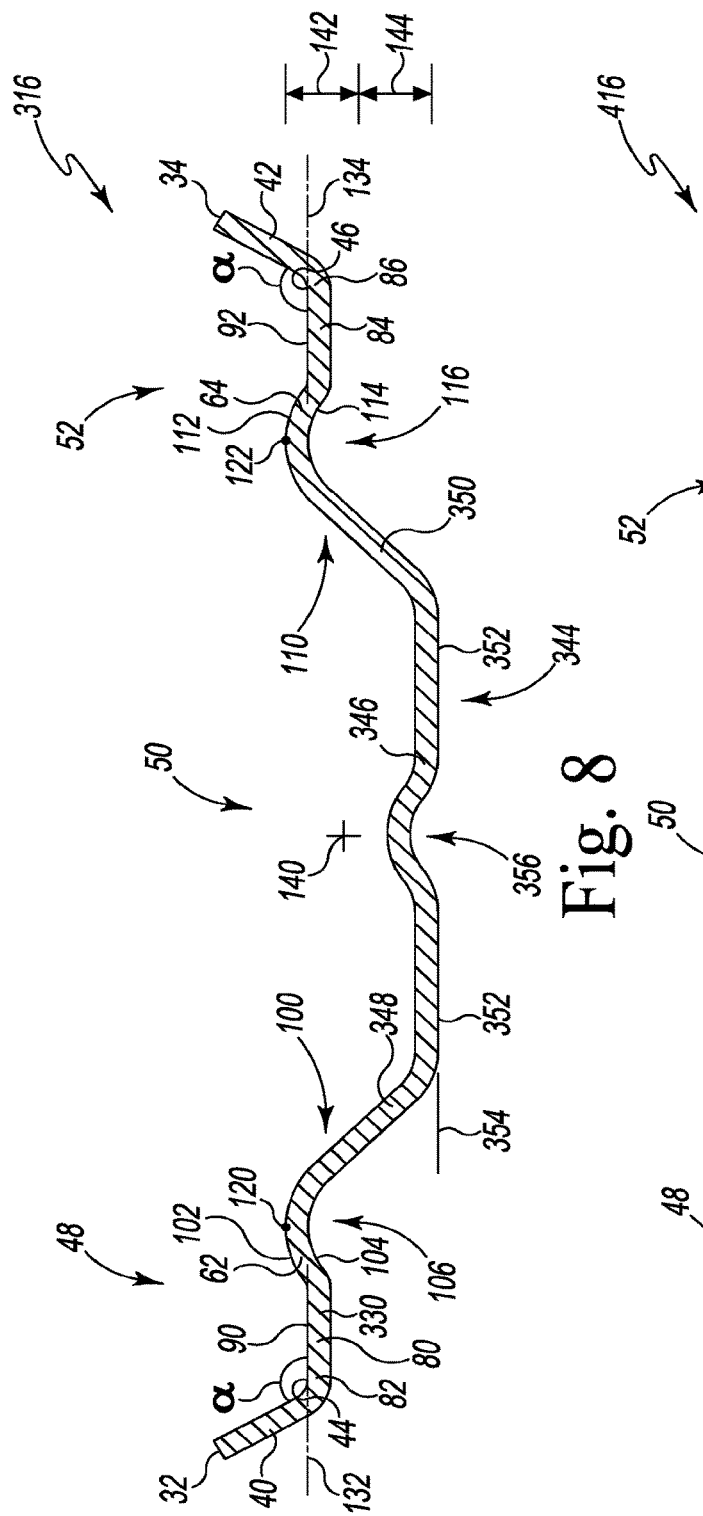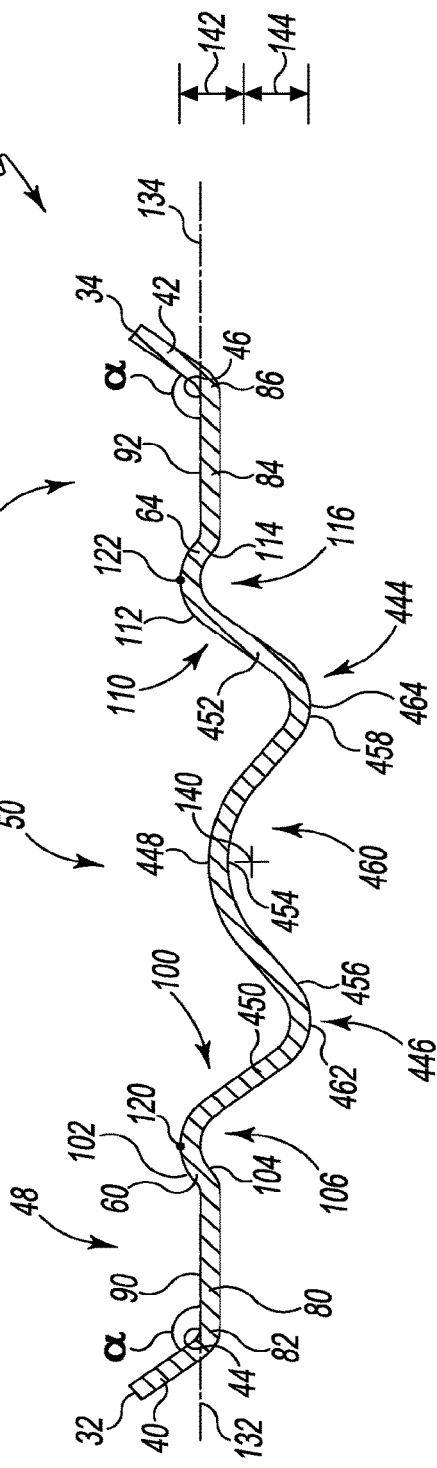

HOSE CLAMP WITH SPRING LINER AND METHOD

This application is a national stage entry under 35 U.S.C. § 371 of PCT International Stage Patent App. No. PCT/US2018/061241, which was filed Nov. 15, 2018, and claims priority to U.S. patent application Ser. No. 62/586,634, which was filed on Nov. 15, 2017. The entire disclosure of each of the foregoing applications is expressly incorporated herein by reference.

BACKGROUND

The present disclosure relates to clamp designs and, more specifically, to a design for a hose clamp with a spring liner.

TECHNICAL FIELD

Hose clamps are commonly utilized to join together hoses and fittings or connectors, for example, within the automotive industry. Hose clamps may include a liner that may be spot welded, riveted, or otherwise fastened to a circular outer band and a locking mechanism to couple the ends of the outer band together and apply tension to the clamp. A radial load may be created by the tension and may be transmitted to the fittings of the joint as a radial load. Examples of hose clamps are shown and described in U.S. Pat. Nos. 8,650,719; 8,677,571; and 7,302,741, which are incorporated herein by reference.

Hose clamps may be sold to companies that supply hose or duct sub-assemblies to the end user. These sub-assemblies typically include a hose substrate and one or more clamps. A typical hose clamp application targets a predetermined band tension that is determined empirically or theoretically to affect a seal on a hose/fitting assembly (joint). Band tension is a function of installation torque, bolt diameter, thread "K" factor, spring rate of the hose/joint, and friction between the clamp and the hose.

In a hose clamp with a spring liner, the components (e.g., substrate, liner, clamp, and fitting) act like springs in series in which the total deflection is the sum of all of the deflections from each component. However, because the clamp and fitting are typically more stiff than the liner and the hose, most of the deflection is absorbed by the spring liner and substrate. The spring liner mitigates hose relaxation and joint thermal expansion factors by compressing the hose at the peak(s) of the liner and by storing spring energy in the liner to compensate.

A factor that can influence how much the hose is compressed and how much spring energy is stored in the spring liner is the amount of offset between the band seat of the liner and the liner peak. The liner peak is the point or section of the spring liner having the smallest radius.

A spring liner may be manufactured by curling a straight stick or plate and then cutting the curled plate to form an individual liner. In the curling operation, a plate may be passed through a set of rollers that curl the plate into a ring shape.

SUMMARY

According to one aspect of the disclosure, a spring liner for a hose clamp is disclosed. The spring liner comprises an annular body having a central axis. The annular body comprises a first body section extending axially from an outer end to an inner end, a second body section extending axially from an outer end to an inner end spaced apart from the inner end of the first body section, and a central body section connecting the inner end of the first body section to the inner end of the second body section. The central body section includes a tip that is positioned radially inward of the outer ends of the first body section and the second body section. The outer ends of the first body section and the second body section are positioned radially inward of the inner ends of first body section and the second body section.

In some embodiments, the annular body may extend along the central axis from a first axial tip to a second axial tip. The annular body may further comprise a first outer flange extending from a flange end connected to the outer end of the first body section to the first axial tip, and a second outer flange extending from a flange end connected to the outer end of the second body section to the second axial tip.

In some embodiments, the inner ends of the first body section and the second body section may define a seat for an annular band of the hose clamp.

In some embodiments, the central body section may include a rib that has a convexly curved inner surface. The convexly curved inner surface may include the tip that is positioned radially inward of the outer ends of the first body section and the second body section.

In some embodiments, when the annular body is viewed in cross section, the first body section may include an outer annular surface that extends along a first substantially straight line from the outer end to the inner end. The term "substantially" as used herein refers to structures that are made within manufacturing tolerances. For example, a surface that extends along a substantially straight line extends along a straight line within manufacturing tolerances. The second body section may include an outer annular surface that extends along a second substantially straight line from the outer end to the inner end of the second body section. The second substantially straight line may extend at a non-orthogonal angle relative to the first substantially straight line.

In some embodiments, the first body section may include a first rib that defines the inner end of the first body section. The first rib may have a convex curved outer surface that faces away from the central axis. The second body section may include a second rib that defines the inner end of the second body section. The second rib may have a convex curved outer surface that faces away from the central axis.

Additionally, in some embodiments, the first body section may include a first annular strip extending axially from the outer end to the first rib. The first annular strip may be positioned radially inward from an apex of the convex curved outer surface of the first rib. The second body section may include a second annular strip extending axially from the outer end to the second rib. The second annular strip may be positioned radially inward from an apex of the convex curved outer surface of the second rib.

In some embodiments, when the annular body is viewed in cross section, the first annular strip may extend along a first substantially straight line, and the second annular strip may extend along a second substantially straight line. Additionally, in some embodiments, the central body section may include a third rib that has a convexly curved inner surface that faces the central axis. The convexly curved inner surface may include the tip of the central body section. In some embodiments, the central body section may include a fourth rib that has a convexly curved inner surface that faces the central axis.

In some embodiments, when the annular body is viewed in cross section, the central body section may include an inner surface that extends along a substantially straight line and includes the tip of the central body section.

According to another aspect, a hose clamp is disclosed. The hose clamp comprises an annular band having a central axis and a substantially cylindrical inner surface. The clamp also comprises a spring liner configured be positioned radially inward of the annular band. The spring liner comprises a first body section extending axially from an outer end to an inner end, a second body section extending axially from an outer end to an inner end spaced apart from the inner end of the first body section, and a central body section connecting the inner end of the first body section to the inner end of the second body section. The inner ends of the first body section and the second body section engage the substantially cylindrical inner surface of the annular band, and the outer ends of the first body section and the second body section are spaced apart from the substantially cylindrical inner surface of the annular band. The central body section includes a tip that is positioned radially inward of the outer ends of the first body section and the second body section.

In some embodiments, the spring liner may extend along the central axis from a first axial tip to a second axial tip. The spring liner may further comprise a first outer flange extending from a flange end connected to the outer end of the first body section to the first axial tip, and a second outer flange extending from a flange end connected to the outer end of the second body section to the second axial tip.

Additionally, in some embodiments, the annular band may have a width defined along the central axis between a first axial end and a second axial end. The spring liner may have an axial width defined along the central axis between the first axial tip and the second axial tip that is greater than the width of the annular band.

In some embodiments, when the hose clamp is viewed in cross section, the first body section may include an outer annular surface that extends along a first substantially straight line from the outer end to the inner end. The second body section may include an outer annular surface that extends along a second substantially straight line from the outer end to the inner end of the second body section. The second substantially straight line may extend at a non-orthogonal angle relative to the first substantially straight line.

In some embodiments, when the hose clamp is viewed in cross section the substantially cylindrical inner surface of the annular band extends along a third substantially straight line. A first acute angle may be defined between the first substantially straight line and the third substantially straight line, and a second acute angle may be defined between the second substantially straight line and the third substantially straight line.

In some embodiments, the first body section may include a first rib that defines the inner end of the first body section. The first rib may have a convex curved outer surface that faces away from the central axis and engages the substantially cylindrical inner surface of the annular band. In some embodiments, the second body section may include a second rib that defines the inner end of the second body section. The second rib may have a convex curved outer surface that faces away from the central axis and engages the substantially cylindrical inner surface of the annular band.

In some embodiments, the first body section may include a first annular strip extending axially from the outer end to the first rib. The first annular strip may be positioned radially inward from the substantially cylindrical inner surface of the annular band. Additionally, in some embodiments, the second body section may include a second annular strip extending axially from the outer end to the second rib. The second annular strip may be positioned radially inward from the substantially cylindrical inner surface of the annular band.

In some embodiments, the first body section may be configured to deflect elastically to move its outer end relative to the substantially cylindrical inner surface of the annular band. Additionally, in some embodiments, the second body section may be configured to deflect elastically to move its outer end relative to the substantially cylindrical inner surface of the annular band.

According to another aspect, a method is disclosed. The method comprises positioning a hose clamp over a substrate, the hose clamp including an annular band and a spring liner positioned between the annular band and the substrate, applying a first radial load to the annular band to advance a tip of the spring liner into engagement with the substrate, applying a second radial load to the annular band to advance the tip of the spring liner into greater engagement with the substrate and advance outer ends of the spring liner into engagement with the substrate, and applying a third radial load to the annular band to deflect the outer ends of the spring liner radially outward to decrease a gap defined between each outer end and the annular band.

According to another aspect, an apparatus including a spring liner is disclosed. The spring liner comprises an annular body having a central axis. The annular body includes a body section that defines a band seat configured to engage an outer band of the hose clamp, and a tip that is positioned radially inward of the band seat. When the annular body is viewed in cross-section, a centroid of the annular body is positioned between the tip and the band seat, a first radial distance is defined between the tip and the centroid, and a second radial distance is defined between the band seat and the centroid. The second radial distance is equal to the first distance.

According to another aspect, a method of manufacturing a spring liner is disclosed. The method comprises selecting a metallic strip that includes a neutral axis, determining a diameter of a band seat of the spring liner, determining an amount of offset between the band seat and a peak of the liner, determining a ratio between the amount of offset and the diameter of the band seat, positioning the band seat relative to the neutral axis of the metallic strip based on the ratio, and curling the metallic strip to form the spring liner. The peak is positioned radially inward from the band seat.

In some embodiments, when the ratio between the amount of offset and the diameter of the band seat is less than 0.05, positioning the band seat relative to the neutral axis of the metallic strip based on the ratio may include positioning the band seat to extend along the neutral axis when the spring liner is viewed in cross-section.

In some embodiments, when the ratio between the amount of offset and the diameter of the band seat is greater than 0.05, positioning the band seat relative to the neutral axis of the metallic strip based on the ratio may include offsetting the band seat from the neutral axis when the spring liner is viewed in cross-section. Additionally, in some embodiments, offsetting the band seat from the neutral axis when the spring liner is viewed in cross-section may include positioning the neutral axis between the band seat and the peak when the spring liner is viewed in cross-section.

In some embodiments, positioning the neutral axis between the band seat and the peak may include positioning the neutral axis equal distances from the band seat and the peak.

According to another aspect, a method of making a spring liner, comprises selecting a metallic strip that includes a neutral axis, determining a radius of a band seat of the spring liner, determining an amount of offset between the band seat and a peak of the liner, determining a ratio between the amount of offset and the radius of the band seat, positioning the band seat relative to the neutral axis of the metallic strip based on the ratio, and curling the metallic strip to form the spring liner. The peak is positioned radially inward from the band seat.

In some embodiments, when the ratio between the amount of offset and the radius of the band seat is less than 0.1, positioning the band seat relative to the neutral axis of the metallic strip based on the ratio may include aligning the band seat with the neutral axis when the spring liner is viewed in cross-section. Additionally, in some embodiments, when the ratio between the amount of offset and the radius of the band seat is greater than 0.1, positioning the band seat relative to the neutral axis of the metallic strip based on the ratio may include offsetting the band seat from the neutral axis when the spring liner is viewed in cross-section.

In some embodiments, offsetting the band seat from the neutral axis when the spring liner is viewed in cross-section may include moving the band seat away from the neutral axis to position the neutral axis between the band seat and the peak when the spring liner is viewed in cross-section. In some embodiments, positioning the neutral axis between the band seat and the peak may include positioning the neutral axis equal distances from the band seat and the peak.

BRIEF DESCRIPTION OF THE DRAWINGS

The detailed description particularly refers to the following figures, in which:

FIG. 3 is a cross-sectional elevation view of the spring liner taken along the line 3-3 in FIG. 2;

FIG. 4 is a cross-sectional elevation view of the hose clamp of FIG. 1 under a radial load;

FIG. 6 is a cross-sectional elevation view of the spring liner taken along the line 6-6 in FIG. 5;

FIG. 7 is a cross-sectional elevation view of the hose clamp of FIG. 1 with the spring liner of FIG. 4 under a radial load;

FIG. 8 is a cross-sectional elevation view similar to FIG. 3 of another embodiment of a spring liner for the hose clamp of FIG. 1;

FIG. 9 is a cross-sectional elevation view similar to FIG. 3 of another embodiment of a spring liner for the hose clamp of FIG. 1;

DETAILED DESCRIPTION OF THE DRAWINGS

Figure 1:
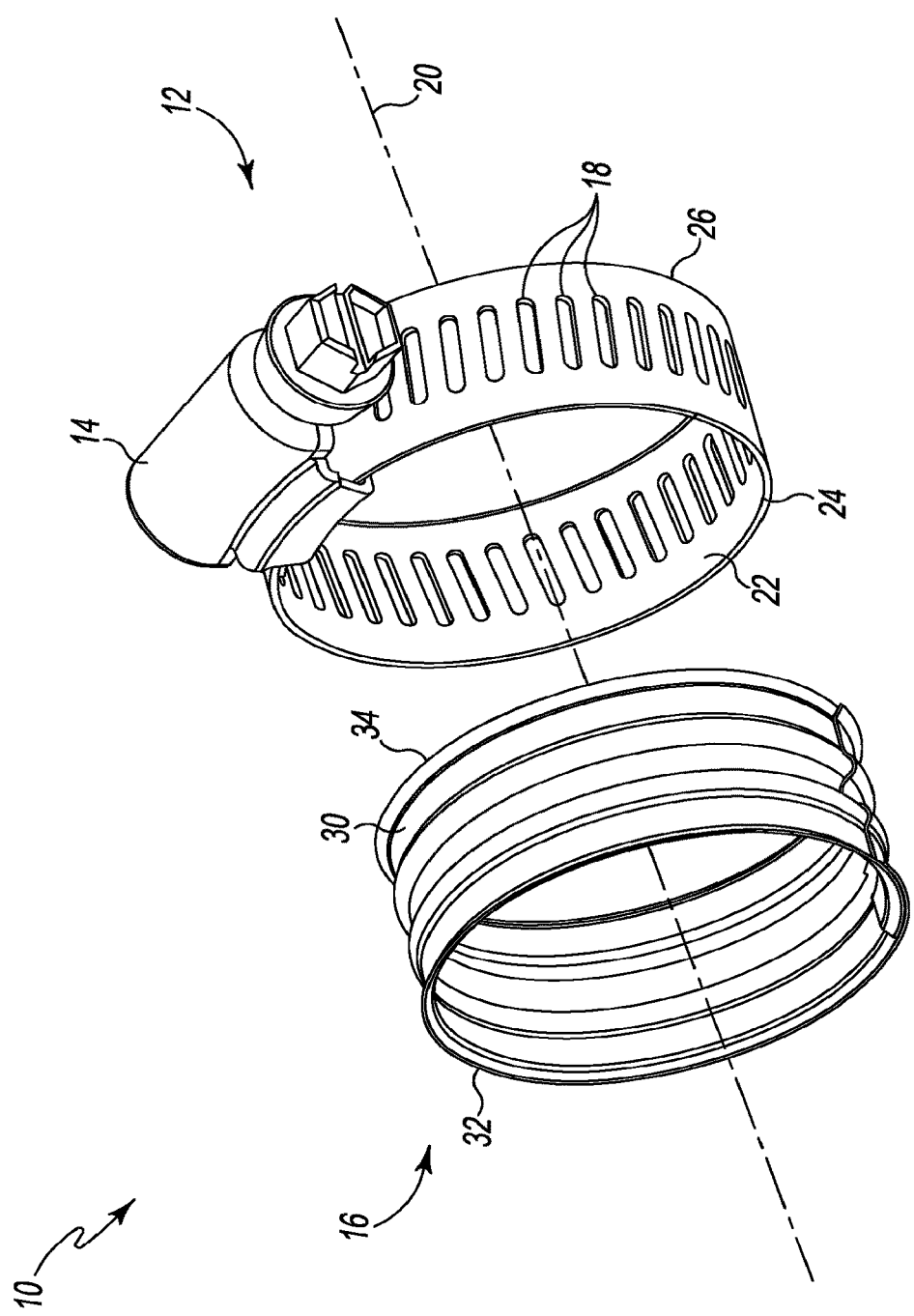
FIG. 1 is a perspective exploded view of a hose clamp including an outer annular band and a spring liner.

While the concepts of the present disclosure are susceptible to various modifications and alternative forms, specific exemplary embodiments thereof have been illustrated by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring now to FIG. 1, a hose clamp assembly 10 is shown. The hose clamp assembly 10 includes an outer band 12 having a tensioning mechanism 14 and a spring liner 16 configured to engage a substrate 150. The outer band 12 includes a plurality of slots 18 that are configured to interact with the tensioning mechanism 14 to tighten or loosen the hose clamp assembly 10. When tightening the hose clamp assembly 10, the outer band 12 moves radially inward and applying a load to the substrate as the tensioning mechanism 14 engages successive slots 18 defined in the outer band 12. When loosening the hose clamp assembly 10, the outer band 12 moves radially outward as the tensioning mechanism 14 disengages from successive slots 18 in the outer band 12.

In the illustrative embodiment, the outer band 12 and the tensioning mechanism 14 are formed separately from metallic materials such as, for example, stainless steel. The band 12 and the mechanism 14 are later assembled as shown in FIG. 1. It should be appreciated that in other embodiments the band 12 and some or all of the mechanism 14 may be formed from different materials depending on the use of the clamp assembly 10. Such materials may include polymer materials such as plastic. It should also be appreciated that, although the tensioning mechanism 14 is a screw-type tensioning mechanism, the hose clamp 10 may include a different tensioning mechanism such as, for example, t-bolt tensioning mechanism.

As shown in FIG. 1, the outer band 12 extends around a central axis 20. The outer band 12 includes an inner radial surface 22 that faces toward the central axis 20. The surface 22 extends along the axis 20 from a proximal edge 24 of the band 12 to a distal edge 26. In the illustrative embodiment, the slots 18 extend through the inner radial surface 22 and the outer radial surface of the band 12.

The spring liner 16 of the clamp assembly 10 is configured to be positioned within the outer band 12 between the outer band 12 and the central axis 20 when the clamp is assembled. The spring liner 16 is sized and shaped to share the central axis 20. The spring liner 16 includes an annular band or body 30 that extends axially along the axis 20 from a proximal outer tip 32 to a distal outer tip 34. In the illustrative embodiment, the outer tips 32, 34 of the liner 16 extend beyond the edges 24, 26 of the outer band 12, as described in greater detail below. In that way, the liner 16 has an axial width that is greater than the width of the band 12 defined between the edges 24, 26.

Figure 2:
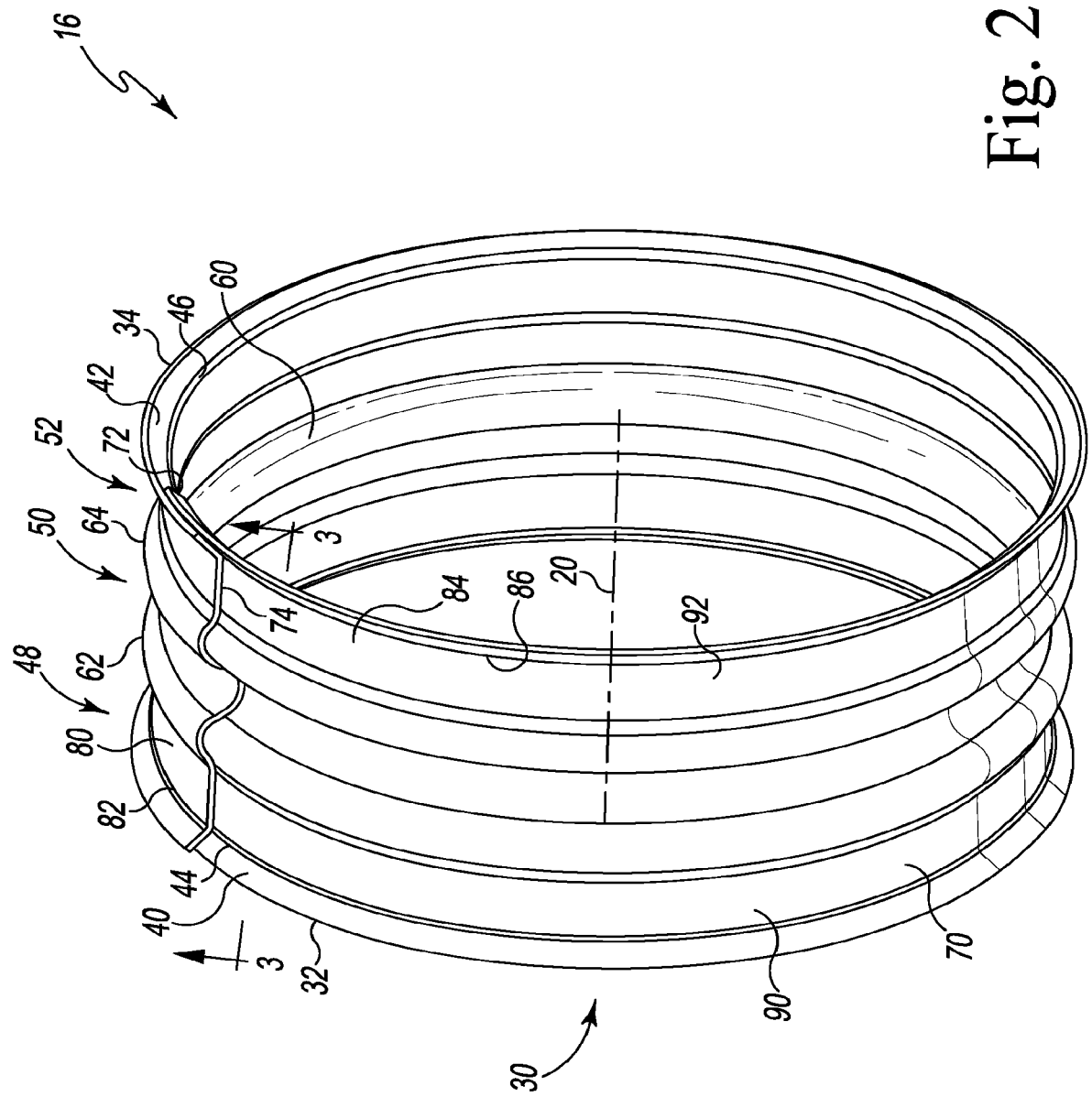
FIG. 2 is a perspective view of the spring liner of FIG. 1.

As shown in FIG. 2, the annular body 30 is a single monolithic component that extends between the outer tips 32, 34. The body 30 includes a pair of flanges 40, 42 that extend inwardly from the outer tips 32, 34, respectively, to inner ends 44, 46. A proximal section 48 of the annular body 30 extends along the central axis 20 from the inner end 44 of the proximal flange 40 to a central section 50. A distal section 52 extends along the central axis 20 from the inner end 46 of the distal flange 42 and is connected to the distal side of the central section 50. The central section 50 of the annular body 30 includes a central rib 60 that radially inward toward the axis 20. A pair of ribs 62, 64 positioned on each side of the central rib 60 extend radially outward from the axis 20.

In the illustrative embodiment, the annular body 30 is formed from an elongated plate 70 that has been curled about the axis 20. The elongated plate 70 extends from a longitudinal end 72 to another longitudinal end 74 that overlaps the end 72. In the illustrative embodiment, the elongated plate 70 (and hence the annular body 30) is formed from a metallic material such as, for example, stainless steel. In one exemplary manufacturing process, the elongated plate 70 is passed through a set of rollers and then curled to form the annular body 30. The elongated plate 70 may be stamped or pressed to cause portions of the plate 70 to extend outwardly to form the ribs 60, 62, 64. The outer edges of the plate 70 are also stamped or pressed to bend the plate 70 to form the flanges 40, 42.

As shown in FIG. 2, the annular body 30 includes a proximal cylindrical strip 80 that extends along the central axis 20 from an outer end 82 connected to the inner end 44 of the proximal flange 40 to the rib 62. The annular body 30 also includes a distal cylindrical strip 84 that extends along the central axis 20 from an outer end 86 connected to the inner end 46 of the distal flange 42 to the rib 64. As described in greater detail below, the cylindrical strips 80, 84 include outer annular surfaces 90, 92 that are initially spaced apart from the inner radial surface 22 of the band 12 (see FIG. 3) such that gaps are defined between the surfaces 22, 90, 92 before a load is applied by the band 12. The strip 80, 84 are configured to deflect outwardly to advance the surfaces 90, 92 toward the inner radial surface 22 (see FIG. 4) when a load is applied by the outer band 12, and, when a predetermined load is applied by the outer band 12, the surfaces 90, 92 are configured to engage the inner surface 22.

Referring now to FIG. 3, the rib 62 defines an inner end 100 of the proximal section 48. The rib 62 includes a convex curved outer surface 102 that faces away from the central axis 20 and a concave curved inner surface 104 positioned opposite the outer surface 102. In the illustrative embodiment, the inner surface 104 of the rib 62 defines a channel 106 that faces the central axis 20.

The other rib 64 defines an inner end 110 of the distal section 52. Similar to the rib 62, the rib 64 includes a convex curved outer surface 112 that faces away from the central axis 20 and a concave curved inner surface 114 positioned opposite the outer surface 112. In the illustrative embodiment, the inner surface 114 of the rib 62 defines a channel 116 that faces the central axis 20.

As shown in FIG. 3, the ribs 62, 64 of the spring liner 16 are configured to engage the inner radial surface 22 of the band 12 along the apexes 120, 122 of their outer surfaces 102, 112, respectively. The cylindrical strips 80, 84 are spaced radially inward from the apexes 120, 122 and the flanges 40, 42 are spaced apart from the band 12 such that the ribs 62, 64 (and, in the illustrative embodiment, the apexes 120, 122) define a seat for the outer band 12 of the clamp 10.

As described above, the annular body 30 includes a central rib 60 positioned in a central section 50. The rib 60 includes a convex curved inner surface 124 that faces toward the central axis 20 and a concave curved outer surface 126 positioned opposite the inner surface 124. In the illustrative embodiment, the outer surface 126 of the rib 60 defines a channel 128 that is positioned between the ribs 62, 64 and faces the central axis 20. The apex of the convex curved inner surface 124 of the central rib 60 also defines a tip 130 of the central body section 50 that is positioned radially inward of the outer ends 82, 86 of the body sections 48, 52.

As shown in the cross-section of FIG. 3, the outer annular surface 90 of the proximal cylindrical strip 80 extends along a substantially straight line 132, and the line 132 extends parallel to the central axis 20 before a load is applied by the band 12. The flange 40 extends outwardly from the strip 80 at angle α defined between the outer annular surface 90 and the flange 40. In the illustrative embodiment, the angle α is equal to about 45 degrees.

Similarly, the outer annular surface 92 of the distal cylindrical strip 84 extends along a substantially straight line 134, and the line 134 extends parallel to the central axis 20 before a load is applied by the band 12. The flange 42 extends outwardly from the strip 84, and, in the illustrative embodiment, the angle α defined between the outer annular surface 92 and the flange 42. It should be appreciated that in other embodiments the flange 42 may extend at angle different from the angle of the flange 40.

As shown in FIG. 3, each segment of the annular body 30 of the spring liner 16 has a centroid 140 when viewed in cross-section. As used herein, the term "centroid" refers to the center of mass of the object shown. As such, the centroid 140 is not the center of mass of the entire annular body 30, but is only the center of mass of the cross-section of the annular body 30 shown in FIG. 3. In the illustrative embodiment, each cross-section of the annular body 30 taken about the axis 20 is substantially the same as the cross-section shown in FIG. 3, except for the region in which the ends 72, 74 overlap.

As described above, the apexes 120, 122 of the ribs 62, 64 define a band seat. As shown in FIG. 3, a distance 142 is defined between the band seat and the centroid 140. Another distance 144 is defined between the centroid 140 and the tip 130 of the central rib 60. In the illustrative embodiment, the distances 142, 144 are equal. It should be appreciated that in other embodiments the distances may be different.

To install the clamp 10, the spring liner 16 is positioned within the outer band 12 of the clamp 10 such that the ribs 62, 64 engage the inner surface 22 of the band 12. The clamp assembly 10 may then be positioned over a substrate 150 such as, for example, a hose fitting of a joint. When properly positioned over the substrate, the user may operate the tensioning mechanism 14 to engage successive slots 18 defined in the outer band 12, thereby decreasing the diameter of the band 12 and advancing the spring liner 16 into engagement with the substrate 150. To further tighten the clamp 10, the band 12 applies a load to the spring liner 16 to move the tip 130 into the outer surface of the substrate 150 and advance the proximal body section 48 and the distal body section 52 into contact with the substrate 150.

As the clamp 10 is tightened, the proximal body section 48 and the distal body section 52 deflect elastically to move their outer ends 82, 86 toward the inner surface 22 of the band 12, as shown in FIG. 4. Portions of the substrate 150 are received in the channels 106, 116 of the ribs 62, 64, and a constant pressure zone 152 is formed below the central section 50 and the ribs 62, 64. In use, the liner 16 is configured to mitigate relaxation and joint thermal expansion factors by compressing the substrate 150 at the tip 130 storing spring energy in the proximal and distal body sections 48, 52.

Figure 5:
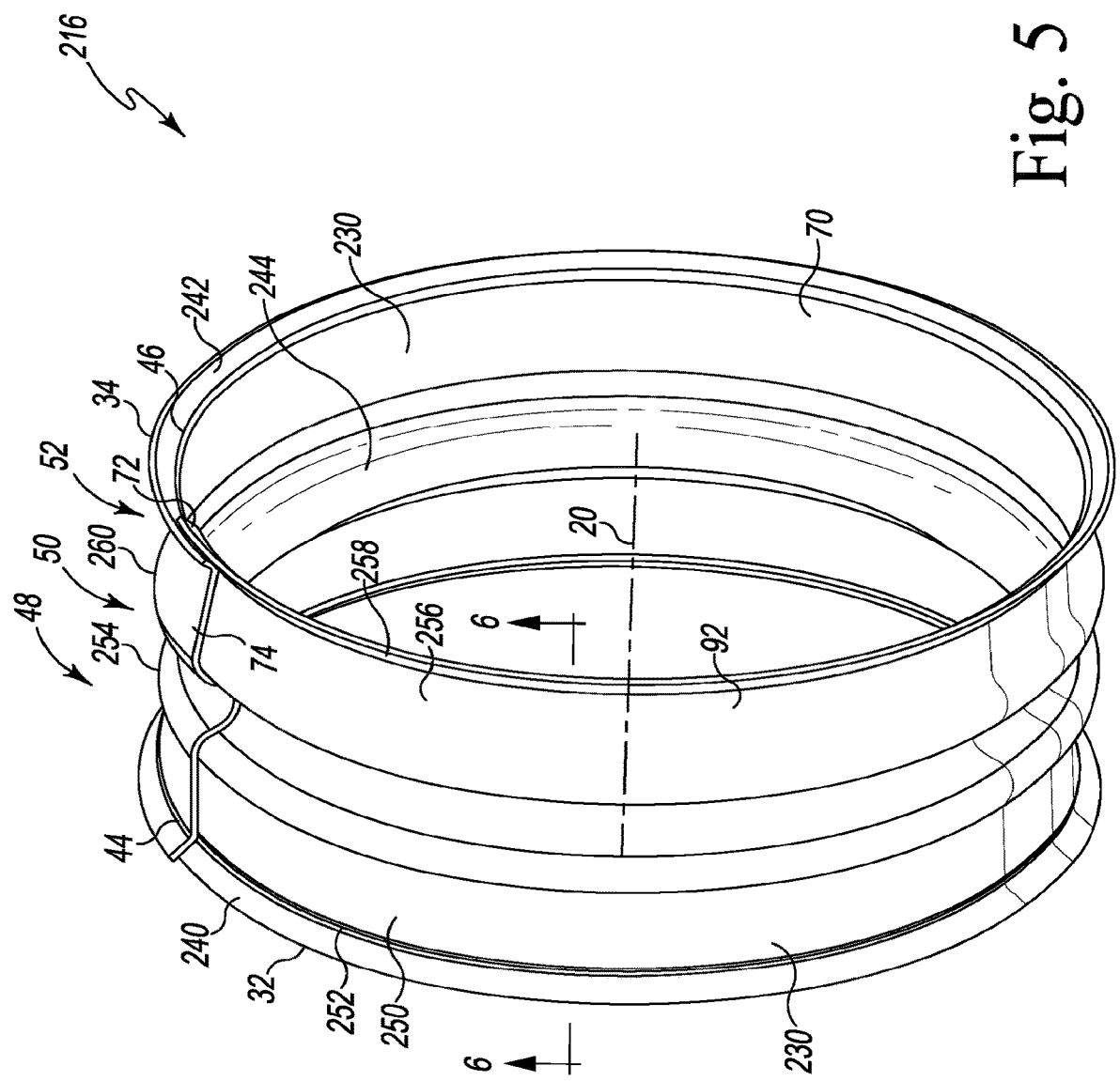
FIG. 5 is a perspective view of another embodiment of a spring liner for the hose clamp of FIG. 1.

Referring now to FIGS. 5-7, another embodiment of a spring liner (herein liner 216) is shown. Various features of the spring liner 216 are similar to those described above in regard to the liner 16. The same reference numbers will be used to identify similar features in the liner 216. As shown in FIG. 5, the liner 216 also has an annular body 230 that is a single monolithic component extending from a proximal outer tip 32 to a distal outer tip 34. The body 230 includes a pair of flanges 240, 242 that extend inwardly from the outer tips 32, 34, respectively, to inner ends 44, 46. A proximal section 48 of the annular body 230 extends along the central axis 20 from the inner end 44 of the proximal flange 240 to a central section 50. A distal section 52 extends along the central axis 20 from the inner end 46 of the distal flange 242 and is connected to the distal side of the central section 50. The central section 50 of the annular body 230 includes a central rib 244 that radially inward toward the axis 20.

In the illustrative embodiment, the annular body 230 is formed from an elongated plate 70 that has been curled about the axis 20. The elongated plate 70 extends from a longitudinal end 72 to another longitudinal end 74 that overlaps the end 72. In the illustrative embodiment, the elongated plate 70 (and hence the annular body 230) is formed from a metallic material such as, for example, stainless steel.

As shown in FIG. 5, the annular body 230 includes a proximal strip 250 that extends along the central axis 20 from an outer end 252 connected to the inner end 44 of the proximal flange 240. The strip 250 extends to an inner end 254 that defines the inner end of the proximal section 48 of the annular body 230. The annular body 230 also includes a distal strip 256 that extends along the central axis 20 from an outer end 258 connected to the inner end 46 of the distal flange 242. The strip 256 extends to an inner end 260 that defines the inner end of the distal section 52 of the annular body 230. As shown in FIG. 6, each segment of the annular body 230 of the spring liner 216 has a centroid 140 when viewed in cross-section.

As described in greater detail below, the strips 250, 256 include outer annular surfaces 280, 282 that are initially angled relative to the inner radial surface 22 of the band 12 (see FIG. 6) before a load is applied by the band 12. In the illustrative embodiment, acute angles are defined between the inner radial surface 22 and the outer annular surfaces 280, 282. As shown in FIG. 3, the inner ends 254, 260 of the strips 250, 256 are spaced apart from the inner radial surface 22 and gaps are formed. In that way, the inner ends 254, 260 are positioned radially outward from the central axis 20 relative to the outer ends 252, 258, respectively, of the strips 250, 256. The strip 250, 256 are configured to deflect outwardly to advance the outer ends 252, 258 of the strips 250, 256, respectively, toward the inner radial surface 22 (see FIG. 7) when a load is applied by the outer band 12, and, when a predetermined load is applied by the outer band 12, the surfaces 280, 282 are configured to engage the inner surface 22.

As described above, the annular body 230 includes a central rib 244 positioned in a central section 50. The rib 244 includes a convex curved inner surface 290 that faces toward the central axis 20 and a concave curved outer surface 292 positioned opposite the inner surface 290. A pair of convex curved surfaces 294, 296 extend from the outer surface 292 and connect to the ends 254, 260 of the strips 250, 256. In the illustrative embodiment, the surfaces 292, 294, 296 of the rib 244 define a channel 298 that is positioned between the ends 254, 260 of the strips 250, 256 and faces the central axis 20. The apex of the convex curved inner surface 290 of the central rib 244 also defines a tip 300 of the central body section 50 that is positioned radially inward of the outer ends 252, 258 of the body sections 48, 52.

As shown in FIG. 6, the inner ends 254, 260 of the body sections 48, 52 are configured to engage the inner radial surface 22 of the band 12 where the inner ends 254, 260 connect to the curved surfaces 294, 296 of the central section 50. The outer annular surface 280 of the proximal strip 250 extends along a substantially straight line 302 at an angle relative to the inner radial surface 22 of the band 12 before a load is applied by the band 12. The flange 240 extends outwardly from the strip 250 at angle β defined between the outer annular surface 280 and the flange 240. In the illustrative embodiment, the angle β is greater than 45 degrees.

Similarly, the outer annular surface 282 of the distal strip 256 extends along a substantially straight line 304 at an angle relative to the inner radial surface 22 of the band 12 before a load is applied by the band 12. The line 304 extends at a non-orthogonal angle relative to the line 302 parallel to the central axis 20 before a load is applied by the band 12. The flange 242 extends outwardly from the strip 256, and, in the illustrative embodiment, the angle β defined between the outer annular surface 282 and the flange 242. It should be appreciated that in other embodiments the flange 242 may extend at angle different from the angle of the flange 240.

As shown in FIG. 6-7, the inner ends 254, 260 of the strips 250, 256 include apexes 120, 122 that define a seat or band set for band 12. As shown in FIG. 6, a distance 142 is defined between the band seat and the centroid 140. Another distance 144 is defined between the centroid 140 and the tip 300 of the central rib 244. In the illustrative embodiment, the distances 142, 144 are equal. It should be appreciated that in other embodiments the distances may be different.

To install the clamp 10 with the spring liner 216, the spring liner 216 is positioned within the outer band 12 of the clamp 10 such that the inner ends 254, 260 of the sections 48, 52 engage the inner surface 22 of the band 12. The clamp assembly 10 may then be positioned over a substrate 150 such as, for example, a hose fitting of a joint. When properly positioned over the substrate, the user may operate the tensioning mechanism 14 to engage successive slots 18 defined in the outer band 12, thereby decreasing the diameter of the band 12 and advancing the spring liner 216 into engagement with the substrate 150. To further tighten the clamp 10, the band 12 applies a load to the spring liner 216 to move the tip 300 into the outer surface of the substrate 150 and advance the proximal body section 48 and the distal body section 52 of the liner 216 into contact with the substrate 150.

As the clamp 10 is tightened, the proximal body section 48 and the distal body section 52 deflect elastically to move their outer ends 252, 258 toward the inner surface 22 of the band 12, as shown in FIG. 7. A constant pressure zone 152 is formed below the central section 50 and inner ends 254, 260 of the strips 250, 256. In use, the liner 216 is configured to mitigate relaxation and joint thermal expansion factors by compressing the substrate 150 at the tip 300 storing spring energy in the proximal and distal body sections 48, 52.

Referring now to FIG. 8, another embodiment of a spring liner (herein liner 316) is shown. Various features of the spring liner 316 are similar to those described above in regard to the liners 16, 216. The same reference numbers will be used to identify similar features in the liner 316. As shown in FIG. 8, the liner 316 also has an annular body 330 that is a single monolithic component that wraps around the central axis 20 (not shown). In the illustrative embodiment, the annular body 330 is formed from an elongated plate made of a metallic material such as, for example, stainless steel.

The body 330 extends along the central axis from a proximal outer tip 32 to a distal outer tip 34. The body 330 includes a pair of flanges 40, 42 that extend inwardly from the outer tips 32, 34, respectively, to inner ends 44, 46. A proximal section 48 of the annular body 330 extends along the central axis from the inner end 44 of the proximal flange 40 to a central section 50. A distal section 52 extends along the central axis 20 from the inner end 46 of the distal flange 42 and is connected to the distal side of the central section 50. The central section 50 of the annular body 330 includes a central rib 344 that radially inward toward the central axis. A pair of ribs 62, 64 positioned on each side of the central rib 344 extend radially outward from the central axis.

As shown in FIG. 8, the annular body 330 includes a proximal cylindrical strip 80 that extends along the central axis 20 from an outer end 82 connected to the inner end 44 of the proximal flange 40 to the rib 62. The annular body 30 also includes a distal cylindrical strip 84 that extends along the central axis 20 from an outer end 86 connected to the inner end 46 of the distal flange 42 to the rib 64.

The rib 62 defines an inner end 100 of the proximal section 48. The rib 62 includes a convex curved outer surface 102 that faces away from the central axis 20 and a concave curved inner surface 104 positioned opposite the outer surface 102. In the illustrative embodiment, the inner surface 104 of the rib 62 defines a channel 106 that faces the central axis 20.

The other rib 64 defines an inner end 110 of the distal section 52. Similar to the rib 62, the rib 64 includes a convex curved outer surface 112 that faces away from the central axis 20 and a concave curved inner surface 114 positioned opposite the outer surface 112. In the illustrative embodiment, the inner surface 114 of the rib 62 defines a channel 116 that faces the central axis 20.

The ribs 62, 64 of the spring liner 316 are configured to engage the inner radial surface 22 of the band 12 along the apexes 120, 122 of their outer surfaces 102, 112, respectively. The cylindrical strips 80, 84 are spaced radially inward from the apexes 120, 122 and the flanges 40, 42 are spaced apart from the band 12 such that the ribs 62, 64 (and, in the illustrative embodiment, the apexes 120, 122) define a seat for the outer band 12 of the clamp 10.

As shown in the cross-section of FIG. 8, the outer annular surface 90 of the proximal cylindrical strip 80 extends along a substantially straight line 132, and the line 132 extends parallel to the central axis 20 before a load is applied by the band 12. The flange 40 extends outwardly from the strip 80 at angle α defined between the outer annular surface 90 and the flange 40. In the illustrative embodiment, the angle α is equal to about 45 degrees.

Similarly, the outer annular surface 92 of the distal cylindrical strip 84 extends along a substantially straight line 134, and the line 134 extends parallel to the central axis 20 before a load is applied by the band 12. The flange 42 extends outwardly from the strip 84, and, in the illustrative embodiment, the angle α defined between the outer annular surface 92 and the flange 42. It should be appreciated that in other embodiments the flange 42 may extend at angle different from the angle of the flange 40.

As described above, the annular body 430 includes a central rib 344 positioned in a central section 50. In the illustrative embodiment, the central rib 344 includes a cylindrical section 346 that is connected to the ribs 62, 64 via a pair of legs 348, 350, respectively. In the cross-section shown in FIG. 8, the cylindrical section 346 includes an inner surface 352 that extends along a straight line 354 between the legs 348, 350. The line 354 extends parallel to the central axis 20 before a load is applied by the band 12. As shown in FIG. 8, the surface 352 includes a circumferential groove 356 that extends around the central axis 20. The inner surface 352 in this embodiment defines the tip 360 of the central body section 50. The tip 360 is positioned radially inward of the outer ends 82, 86 of the body sections 48, 52.

As described above, the apexes 120, 122 of the ribs 62, 64 define a band seat. As shown in FIG. 8, a distance 142 is defined between the band seat and the centroid 140 of the segment of the body 330. Another distance 144 is defined between the centroid 140 and the inner surface 352 of the central rib 344. In the illustrative embodiment, the distances 142, 144 are equal. It should be appreciated that in other embodiments the distances may be different.

In operation, the liner 316 compresses the substrate into high pressure zones. The cylindrical section 346 of the liner 316 deflects elastically, and spring energy is stored in the elastic deflection to mitigate relaxation and joint thermal expansion factors.

Referring now to FIG. 9, another embodiment of a spring liner (herein liner 416) is shown. Various features of the spring liner 416 are similar to those described above in regard to the liners 16, 216, 316. The same reference numbers will be used to identify similar features in the liner 416. As shown in FIG. 9, the liner 416 also has an annular body 430 that is a single monolithic component that wraps around the central axis 20 (not shown). In the illustrative embodiment, the annular body 430 is formed from an elongated plate made of a metallic material such as, for example, stainless steel.

The body 430 extends along the central axis from a proximal outer tip 32 to a distal outer tip 34. The body 430 includes a pair of flanges 40, 42 that extend inwardly from the outer tips 32, 34, respectively, to inner ends 44, 46. A proximal section 48 of the annular body 430 extends along the central axis from the inner end 44 of the proximal flange 40 to a central section 50. A distal section 52 extends along the central axis 20 from the inner end 46 of the distal flange 42 and is connected to the distal side of the central section 50. The central section 50 of the annular body 430 includes a pair of central ribs 444, 446 that radially inward toward the central axis. A pair of ribs 62, 64 positioned on each side of the central section 50 extend radially outward from the central axis.

As shown in FIG. 9, the annular body 430 includes a proximal cylindrical strip 80 that extends along the central axis 20 from an outer end 82 connected to the inner end 44 of the proximal flange 40 to the rib 62. The annular body 30 also includes a distal cylindrical strip 84 that extends along the central axis 20 from an outer end 86 connected to the inner end 46 of the distal flange 42 to the rib 64.

The rib 62 defines an inner end 100 of the proximal section 48. The rib 62 includes a convex curved outer surface 102 that faces away from the central axis 20 and a concave curved inner surface 104 positioned opposite the outer surface 102. In the illustrative embodiment, the inner surface 104 of the rib 62 defines a channel 106 that faces the central axis 20.

The other rib 64 defines an inner end 110 of the distal section 52. Similar to the rib 62, the rib 64 includes a convex curved outer surface 112 that faces away from the central axis 20 and a concave curved inner surface 114 positioned opposite the outer surface 112. In the illustrative embodiment, the inner surface 114 of the rib 62 defines a channel 116 that faces the central axis 20.

The ribs 62, 64 of the spring liner 416 are configured to engage the inner radial surface 22 of the band 12 along the apexes 120, 122 of their outer surfaces 102, 112, respectively. The cylindrical strips 80, 84 are spaced radially inward from the apexes 120, 122 and the flanges 40, 42 are spaced apart from the band 12 such that the ribs 62, 64 (and, in the illustrative embodiment, the apexes 120, 122) define a seat for the outer band 12 of the clamp 10.

As shown in the cross-section of FIG. 9, the outer annular surface 90 of the proximal cylindrical strip 80 extends along a substantially straight line 132, and the line 132 extends parallel to the central axis 20 before a load is applied by the band 12. The flange 40 extends outwardly from the strip 80 at angle α defined between the outer annular surface 90 and the flange 40. In the illustrative embodiment, the angle α is equal to about 45 degrees.

Similarly, the outer annular surface 92 of the distal cylindrical strip 84 extends along a substantially straight line 134, and the line 134 extends parallel to the central axis 20 before a load is applied by the band 12. The flange 42 extends outwardly from the strip 84, and, in the illustrative embodiment, the angle α defined between the outer annular surface 92 and the flange 42. It should be appreciated that in other embodiments the flange 42 may extend at angle different from the angle of the flange 40.

As described above, the annular body 430 includes a pair of central ribs 444, 446 positioned in a central section 50. The annular body 430 also includes a rib 448 that connects the central ribs 444, 446 and a pair of legs 450, 452 that connect the central ribs 444, 446, respectively, to the outer ribs 62, 64. The central section 50 includes a concave curved inner surface 454 that is connected to a convex curved inner surface 456 of the central rib 444 and a convex curved inner surface 458 of the central rib 446. As shown in FIG. 9, the concave curved inner surface 454 defines a channel 460 that faces the central axis (not shown) of the band 12. The inner surfaces 456, 458 in this embodiment defines the tips 462, 464 of the central body section 50. The tips 462, 464 are positioned radially inward of the outer ends 82, 86 of the body sections 48, 52.

As described above, the apexes 120, 122 of the ribs 62, 64 define a band seat. As shown in FIG. 9, a distance 142 is defined between the band seat and the centroid 140 of the segment of the body 430. Another distance 144 is defined between the centroid 140 and the tips 462, 464 of the central ribs 444, 446. In the illustrative embodiment, the distances 142, 144 are equal. It should be appreciated that in other embodiments the distances may be different.

In operation, the liner 416 compresses the substrate into high pressure zones. The central ribs 444, 446 of the liner 316 deflects elastically, and spring energy is stored in the elastic deflection to mitigate relaxation and joint thermal expansion factors.

Figure 10:
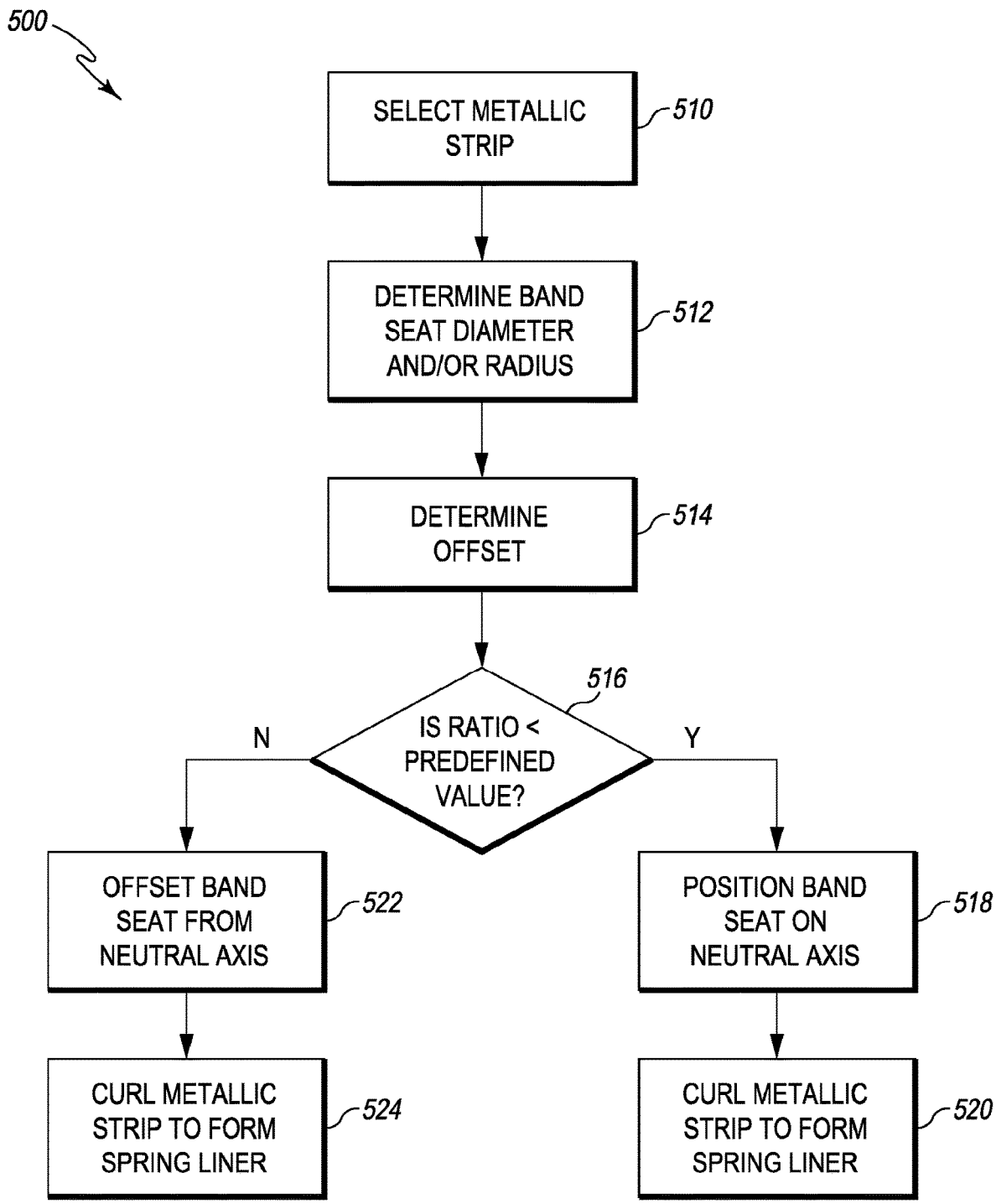
FIG. 10 is a flow chart showing a process for manufacturing a spring liner.
Figure 11:
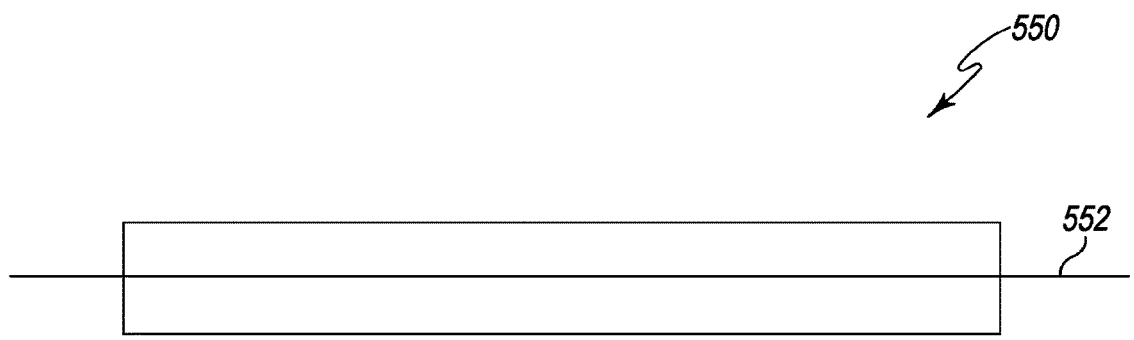
FIG. 11 is a cross-sectional elevation view of a bar or strip of metal for use in manufacturing a spring liner.

Referring now to FIG. 10, a process 500 of designing and manufacturing a spring liner is disclosed. The process 500 may begin in block 510 in which a metallic bar or strip 550 for forming into a spring liner is selected. The strip 550 is substantially straight, and as shown in FIG. 11, the strip 550 has a substantially uniform rectangular cross section. The strip 550 has a neutral axis 552 that extends through its mid-line, as shown in FIG. 11.

Figure 12:
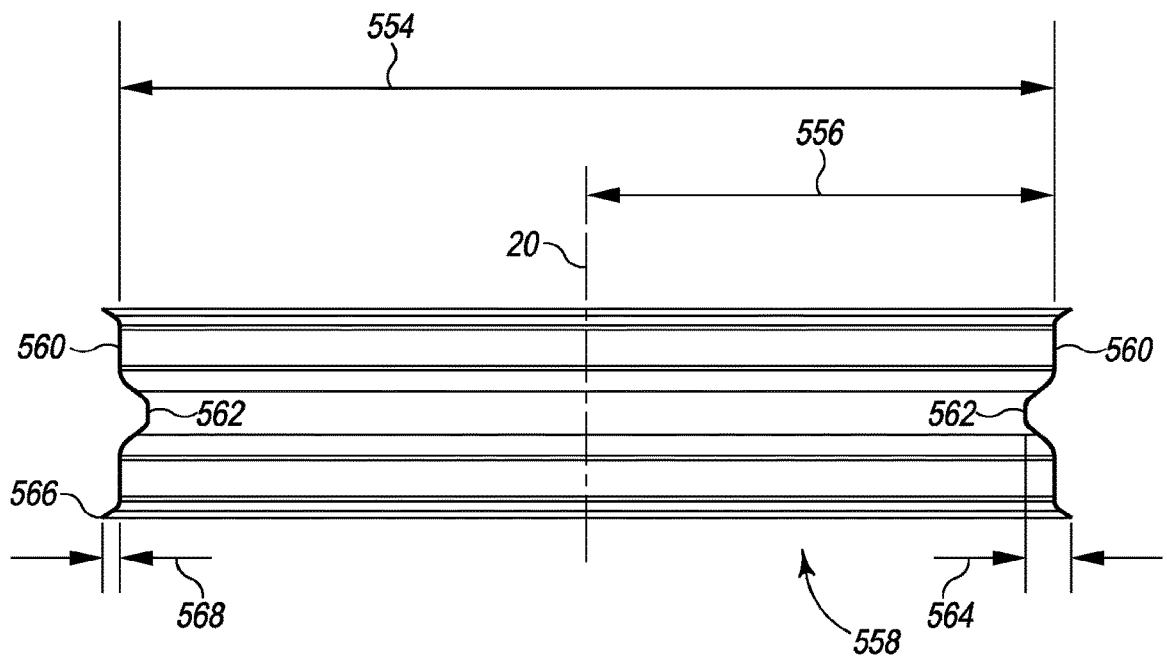
FIG. 12 is a diagrammatic view of dimensions of a spring liner.

The process 500 may advance to block 512 in which a designer may determine a diameter 554 or radius 556 of the band seat of the spring liner for a target substrate. As shown in FIG. 12, the designer may begin with a theoretical model of a spring liner 558 including a band seat 560 to illustrate the diameter 554 and radius 556 and a peak 562, which identifies the most radially-inward point of the spring liner 558. As described above, in some embodiments of the spring liner, the final spring liner design the peak may be a substantially flat or planar inner-most surface (see, e.g., FIG. 8) or may include multiple tips (see, e.g., FIG. 9).

Figure 13:
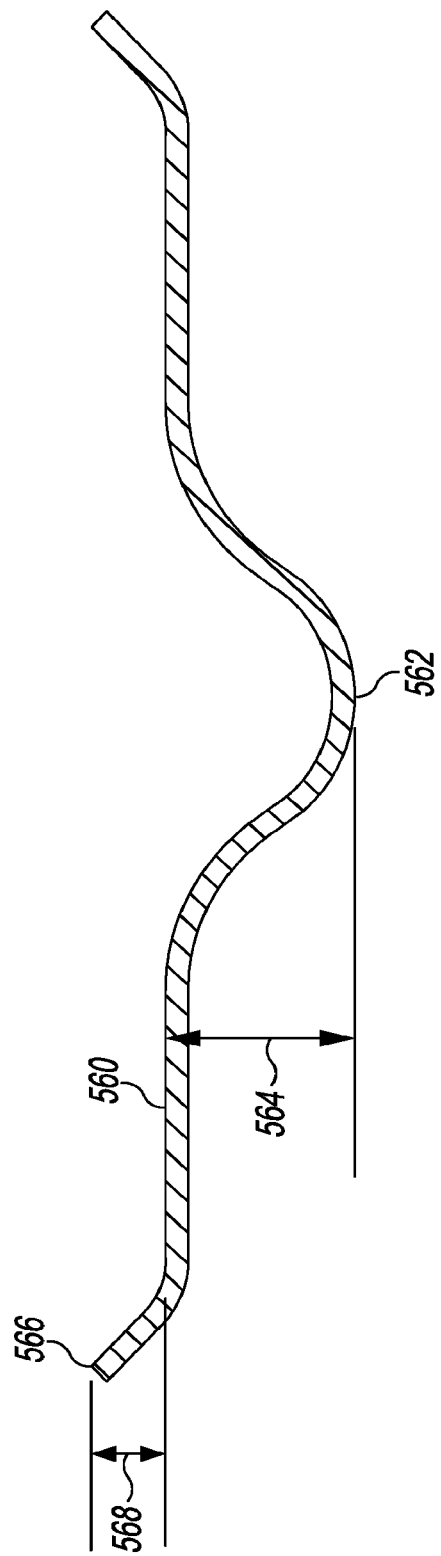
FIG. 13 is a cross-sectional elevation view of a portion of the spring liner of FIG. 12.

The process 500 may then advance to block 514 in which an amount of offset 564 between the band seat 560 and a peak 562 of the liner is calculated. In the illustrative embodiments of liners 16, 216, 316, 416, the offset is the sum of the distances 142, 144 and is the radial distance between the apexes 120, 122 and the tip or inner-most surface of each liner. The offset 564 is shown in FIGS. 12 and 13. As shown in FIGS. 12 and 13, another offset 568 may be calculated between the outer tip 566 of the liner 558 and the band seat 560.

Figure 14:
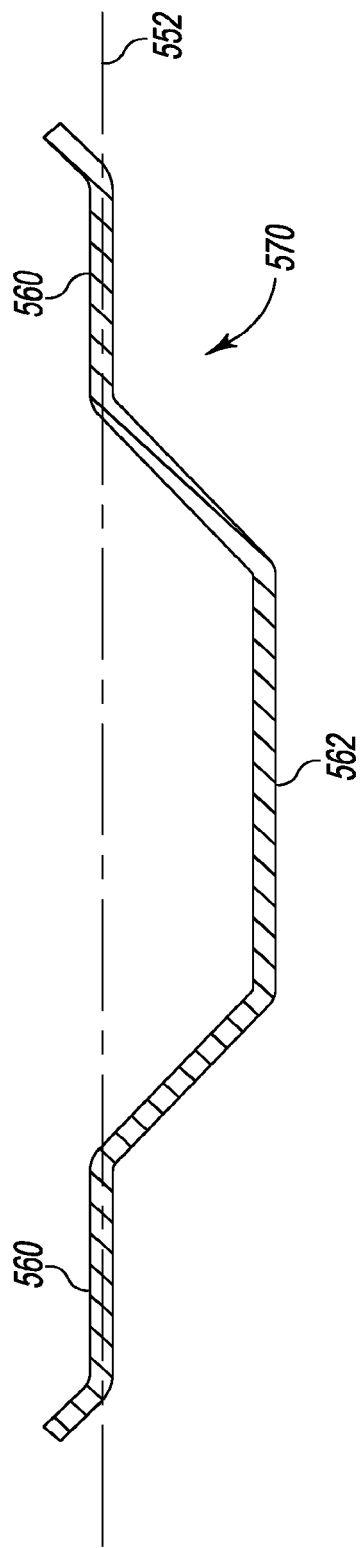
FIG. 14 is a cross-sectional elevation view of a spring liner having a band seat positioned on a neutral axis of the metallic strip.

The process 500 may then advance to block 516 in which a ratio between the amount of offset (e.g., offset 564 or offset 568) and the diameter 554 or the radius 556 is calculated. When the ratio between the amount of offset and the diameter of the band seat is less than a predefined value, the method advances to block 518, and the band seat 560 may be aligned with the neutral axis 552, as shown in, for example, FIG. 14. In the illustrative embodiment, the predefined value is 0.05 when the diameter of the band seat is used to calculate to the ratio and is 0.1 when the radius of the band seat is used to calculate to the ratio. The process 500 may then advance to block 520 in which the metallic strip is curled to form a spring liner 570 in which the band seat 560 is aligned with the neutral axis 552 of the strip.

If the ratio between the amount of offset and the diameter of the band seat determined in block 516 is greater than the predefined value, the method may advance to block 522, and the band seat 560 may be positioned offset from the neutral axis 552, as shown in, for example, the spring liners 16, 216, 316, and 416 in FIGS. 1-9 described above. In those spring liners 16, 216, 316, 416, the centroid 140 is positioned on the neutral axis 552 such that the band seats and the tip or inner-most surfaces of the spring liners are positioned equidistant from the neutral axis 552. As described above, in other embodiments, the band seats and the tip or inner-most surfaces of the spring liners are positioned at different distances from the neutral axis. The process 500 may then advance to block 524 in which the metallic strip is curled to form a spring liner in which the band seat 560 is offset from the neutral axis 552 of the strip. To offset the band seat 560, the metallic strip may be bent or pressed to move the portions of the metallic strip forming the band seat away from the neutral axis 552.

Figure 15:
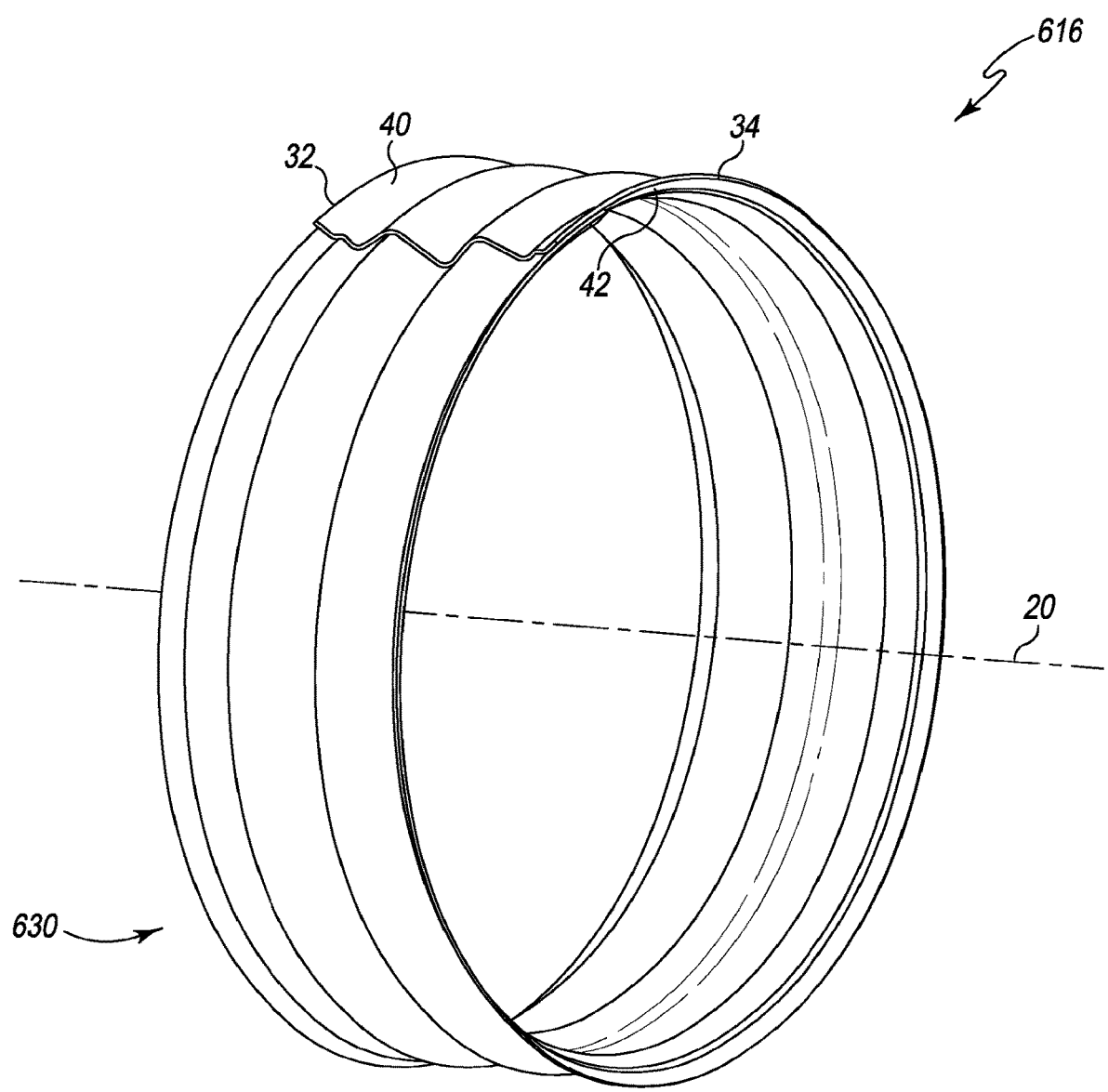
FIG. 15 is a perspective view of another embodiment of a spring liner for the hose clamp of FIG. 1.
Figure 16:
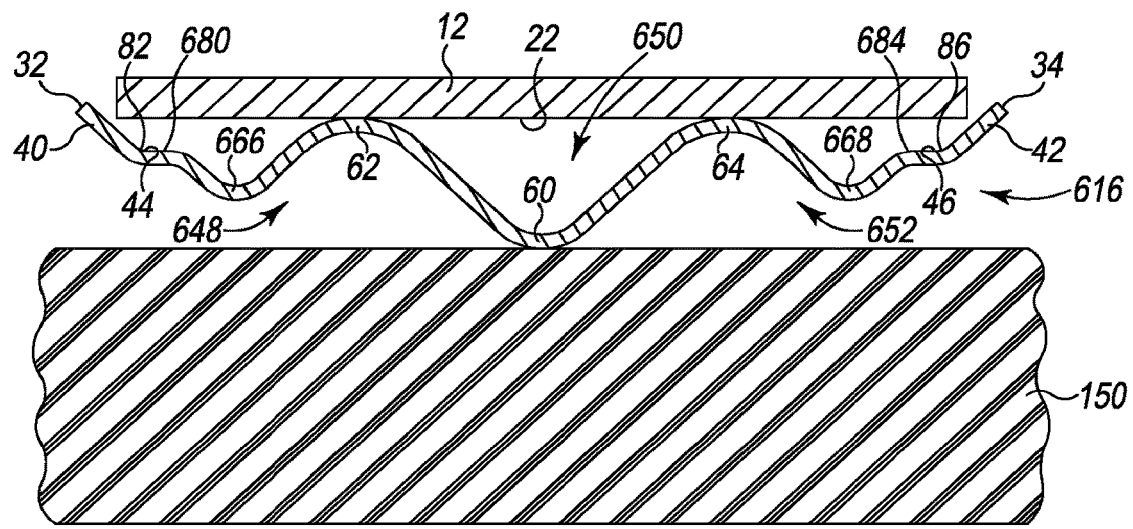
FIG. 16 is a cross-sectional elevation view of the spring liner taken along the line 16-16 in FIG. 15.
Figure 17:
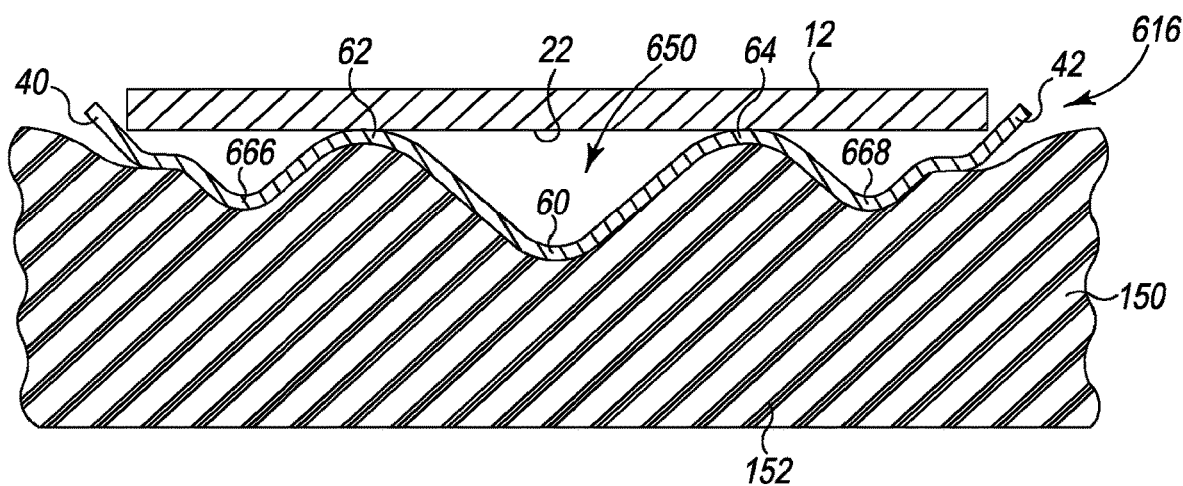
FIG. 17 is a cross-sectional elevation view of the hose clamp of FIG. 1 with the spring liner of FIGS. 15-16 under a radial load.

Referring now to FIGS. 15-17, another embodiment of a spring liner (hereinafter spring liner 616) for the clamp assembly 10 is shown. Similar to the other spring liners described above, the spring liner 616 is positioned within the outer band 12 between the outer band 12 and the central axis 20 when the clamp is assembled. The spring liner 616 is sized and shaped to share the central axis 20. The spring liner 616 includes an annular band or body 630 that extends axially along the axis 20 from a proximal outer tip 32 to a distal outer tip 34. In the illustrative embodiment, the outer tips 32, 34 of the liner 616 extend beyond the edges 24, 26 of the outer band 12. In that way, the liner 616 has an axial width that is greater than the width of the band 12 defined between the edges 24, 26.

The annular body 630 is a single monolithic component, which is formed from a metallic material such as, for example, stainless steel. The body 630 extends between the outer tips 32, 34. The body 630 includes a pair of flanges 40, 42 that extend inwardly from the outer tips 32, 34, respectively, to inner ends 44, 46, as shown in FIG. 16. A proximal section 648 of the annular body 30 extends along the central axis 20 from the inner end 44 of the proximal flange 40 to a central section 650. A distal section 652 extends along the central axis 20 from the inner end 46 of the distal flange 42 and is connected to the distal side of the central section 650. The central section 650 of the annular body 630 includes a central rib 60 that extends radially inward toward the axis 20. A pair of outwardly-facing ribs 62, 64 is positioned on each side of the central rib 60, which extend radially outward from the axis 20. A pair of smaller, inwardly-facing ribs 666, 668 are positioned proximally and distally of the ribs 62, 64, respectively. Each of the ribs 666, 668 extends radially inward toward the axis 20.

As shown in FIG. 16, the annular body 630 includes a proximal cylindrical strip 680 that extends along the central axis 20 from an outer end 82 connected to the inner end 44 of the proximal flange 40 to the rib 666. The annular body 630 also includes a distal cylindrical strip 684 that extends along the central axis 20 from an outer end 86 connected to the inner end 46 of the distal flange 42 to the rib 668. As described in greater detail below, the cylindrical strips 680, 684. Similar to the strips 80, 84 described above, the strips 680, 684 are configured to deflect outwardly to advance proximal and distal portions of the liner 616 (in this case, the flanges 40, 42) toward the inner radial surface 22 of the band (see FIG. 17) when a load is applied by the outer band 12, and, when a predetermined load is applied by the outer band 12, the flanges 40, 42 are configured to engage the inner surface 22.

To install the clamp 10, the spring liner 616 is positioned within the outer band 12 of the clamp 10 such that the ribs 62, 64 engage the inner surface 22 of the band 12. The clamp assembly 10 may then be positioned over a substrate 150 such as, for example, a hose fitting of a joint. When properly positioned over the substrate, the user may operate the tensioning mechanism 14 to engage successive slots 18 defined in the outer band 12, thereby decreasing the diameter of the band 12 and advancing the spring liner 616 into engagement with the substrate 150. To further tighten the clamp 10, the band 12 applies a load to the spring liner 616 to move the rib 60 into the outer surface of the substrate 150.

As the clamp 10 is tightened, the proximal body section 648 and the distal body section 652 deflect elastically to move their outer ends 82, 86 toward the inner surface 22 of the band 12, as shown in FIG. 17. Portions of the substrate 150 are received in the ribs 62, 64, and a constant pressure zone 152 is formed below the central section 50 and the ribs 62, 64. The inwardly-facing ribs 666, 668 prevent complete compression of the liner 616 such that a spring force is retained in the liner 616. In use, the liner 616 is configured to mitigate relaxation and joint thermal expansion factors by compressing the substrate 150 at the rib 60 and storing spring energy in the proximal and distal body sections 48, 52.

The foregoing embodiments were chosen and described in order to illustrate principles of the methods and apparatuses as well as some practical applications. The preceding description enables others skilled in the art to utilize methods and apparatuses in various embodiments and with various modifications as are suited to the particular use contemplated. In accordance with the provisions of the patent statutes, the principles and modes of operation of this disclosure have been explained and illustrated in exemplary embodiments.

It is intended that the scope of the present methods and apparatuses be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

What is claimed is:

1. A spring liner for a hose clamp, the spring liner comprising:
    a metallic annular body having a central axis, the annular body comprising:
    a first body section extending axially from an outer end to an inner end,
    a second body section extending axially from an outer end to an inner end spaced apart from the inner end of the first body section, and
    a central body section connecting the inner end of the first body section to the inner end of the second body section,
    wherein when the spring liner is not loaded:
        (i) a tip of the central body section is positioned radially inward of the first body section and the second body section,
        (ii) the outer ends of the first body section and the second body section are positioned radially inward of the inner ends of first body section and the second body section,
        (iii) a first annular strip of the first body section extends parallel to the central axis from the outer end of the first body section toward the inner end of the first body section, and
        (iv) a second annular strip of the second body section extends parallel to the central axis from the outer end of the second body section toward the inner end of the second body section.

2. The spring liner of claim 1, wherein the annular body extends along the central axis from a first axial tip to a second axial tip, and the annular body further comprises:
    a first outer flange extending from a flange end connected to the outer end of the first body section to the first axial tip, and
    a second outer flange extending from a flange end connected to the outer end of the second body section to the second axial tip.

3. The spring liner of claim 1, wherein the inner ends of the first body section and the second body section define a seat for an annular band of the hose clamp.

4. The spring liner of claim 1, wherein the central body section includes a rib that has a convexly curved inner surface, the convexly curved inner surface including the tip that is positioned radially inward of the first body section and the second body section when the spring liner is not loaded.

5. The spring liner of claim 1, wherein:
    the first body section includes a first rib that defines the inner end of the first body section, the first rib having a convexly curved outer surface that faces away from the central axis, and the second body section includes a second rib that defines the inner end of the second body section, the second rib having a convexly curved outer surface that faces away from the central axis.

6. The spring liner of claim 5, wherein when the spring liner is not loaded:
the first annular strip extends axially from the outer end of the first body section to the first rib, the first annular strip being positioned radially inward from an apex of the convexly curved outer surface of the first rib, and
the second annular strip extends axially from the outer end of the second body section to the second rib, the second annular strip being positioned radially inward from an apex of the convexly curved outer surface of the second rib.

7. The spring liner of claim 6, wherein when the annular body is viewed in cross section, the first annular strip extends along a first substantially straight line, and the second annular strip extends along a second substantially straight line.

8. The spring liner of claim 7, wherein the central body section includes a third rib that has a convexly curved inner surface that faces the central axis, the convexly curved inner surface including the tip of the central body section.

9. The spring liner of claim 8, wherein the central body section includes a fourth rib that has a convexly curved inner surface that faces the central axis.

10. The spring liner of claim 7, wherein when the annular body is viewed in cross section, the central body section includes an inner surface that extends along a substantially straight line and includes the tip of the central body section.

11. The spring liner of claim 1, wherein when the spring liner is not loaded and the annular body is viewed in cross-section:
(i) a centroid of the annular body is positioned between the tip and the inner ends of the first body section and the second body section,
(ii) a first radial distance is defined between the tip and the centroid, and
(iii) a second radial distance is defined between the inners ends of the first body section and the second body section and the centroid, the second radial distance being equal to the first radial distance.

12. The spring liner of claim 11, wherein the centroid of the annular body is positioned on an axis extending through the outer ends of the first body section and the second body section when the spring liner is not loaded.

13. The spring liner of claim 1, wherein the inner ends of the first body section and the second body section define a band seat configured to engage an outer band of the hose clamp.

14. A hose clamp, comprising:
an annular band having a central axis and a substantially cylindrical inner surface, and
a spring liner configured be positioned radially inward of the annular band, the spring liner comprising:
a first body section extending axially from an outer end to an inner end,
a second body section extending axially from an outer end to an inner end spaced apart from the inner end of the first body section, and
a central body section connecting the inner end of the first body section to the inner end of the second body section,
wherein the inner ends of the first body section and the second body section engage the substantially cylindrical inner surface of the annular band, and wherein when the spring liner is not loaded:
(i) the outer ends of the first body section and the second body section are spaced apart from the substantially cylindrical inner surface of the annular band,
(ii) a first annular strip of the first body section extends parallel to the central axis from the outer end of the first body section toward the inner end of the first body section,
(iii) a second annular strip of the second body section extends parallel to the central axis from the outer end of the second body section toward the inner end of the second body section, and
(iv) a tip of the central body section is positioned radially inward of the first body section and the second body section.

15. The hose clamp of claim 14, wherein the spring liner extends along the central axis from a first axial tip to a second axial tip, and the spring liner further comprises:
a first outer flange extending from a flange end connected to the outer end of the first body section to the first axial tip, and
a second outer flange extending from a flange end connected to the outer end of the second body section to the second axial tip.

16. The hose clamp of claim 15, wherein:
the annular band has a width defined along the central axis between a first axial end and a second axial end, and
the spring liner has an axial width defined along the central axis between the first axial tip and the second axial tip that is greater than the width of the annular band.

17. The hose clamp of claim 14, wherein:
the first body section includes a first rib that defines the inner end of the first body section, the first rib having a convexly curved outer surface that faces away from the central axis and engages the substantially cylindrical inner surface of the annular band, and
the second body section includes a second rib that defines the inner end of the second body section, the second rib having a convexly curved outer surface that faces away from the central axis and engages the substantially cylindrical inner surface of the annular band.

18. The hose clamp of claim 17, wherein:
the first annular strip is positioned radially inward from the substantially cylindrical inner surface of the annular band, and
the second annular strip is positioned radially inward from the substantially cylindrical inner surface of the annular band.

19. The hose clamp of claim 14, wherein when the spring liner is being loaded:
the first body section is configured to deflect elastically to move its outer end relative to the substantially cylindrical inner surface of the annular band, and
the second body section is configured to deflect elastically to move its outer end relative to the substantially cylindrical inner surface of the annular band.

20. The hose clamp of claim 14, wherein when the spring liner is not loaded and the annular body is viewed in cross-section:
(i) a centroid of the spring liner is positioned between the tip and the inner ends of the first body section and the second body section,
(ii) a first radial distance is defined between the tip and the centroid, and (iii) a second radial distance is defined between the inners ends of the first body section and the second body section and the centroid, the second radial distance being equal to the first radial distance.

21. The hose clamp of claim 20, wherein the centroid of the spring liner is positioned on an axis extending through the outer ends of the first body section and the second body section when the spring liner is not loaded.

* * * * *